United States Patent
Hwang et al.

(10) Patent No.: US 12,537,246 B2
(45) Date of Patent: Jan. 27, 2026

(54) POUCH FILM STACK AND SECONDARY BATTERY

(71) Applicant: LG Energy Solution, Ltd., Seoul (KR)

(72) Inventors: Soo Ji Hwang, Daejeon (KR); Sang Hun Kim, Daejeon (KR); Hyung Kyun Yu, Daejeon (KR); Min Hyeong Kang, Daejeon (KR); Dae Woong Song, Daejeon (KR); Hun Hee Lim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 62 days.

(21) Appl. No.: 18/573,259

(22) PCT Filed: Sep. 28, 2022

(86) PCT No.: PCT/KR2022/014552
§ 371 (c)(1),
(2) Date: Dec. 21, 2023

(87) PCT Pub. No.: WO2023/055069
PCT Pub. Date: Apr. 6, 2023

(65) Prior Publication Data
US 2024/0266645 A1  Aug. 8, 2024

(30) Foreign Application Priority Data
Oct. 1, 2021 (KR) .................. 10-2021-0131121

(51) Int. Cl.
*H01M 50/131* (2021.01)
*H01M 50/105* (2021.01)
(Continued)

(52) U.S. Cl.
CPC ....... *H01M 50/129* (2021.01); *H01M 50/105* (2021.01); *H01M 50/119* (2021.01);
(Continued)

(58) Field of Classification Search
None
See application file for complete search history.

(56) References Cited

U.S. PATENT DOCUMENTS

2003/0180609 A1  9/2003  Yamashita et al.
2015/0372263 A1  12/2015  Douke et al.
(Continued)

FOREIGN PATENT DOCUMENTS

CN  112793253 A  5/2021
JP  H09120804 A  5/1997
(Continued)

OTHER PUBLICATIONS

Extended European Search Report including Written Opinion for Application No. 22876841.2 dated Mar. 25, 2025. 6 pages.
(Continued)

*Primary Examiner* — Yoshitoshi Takeuchi
(74) *Attorney, Agent, or Firm* — Lerner David LLP (57) ABSTRACT

A pouch film stack according to the present invention includes a base layer, a gas barrier layer, and a sealant layer stacked in that order. The sealant layer includes a first sealant layer located adjacent to the gas barrier layer and a second sealant layer stacked on the first sealant layer. A percentage
(Continued)

difference in yield strength between the first and second sealant layers (ΔY) is 66% to 120%, where ΔY is defined as: {(Yield strength of second sealant layer−Yield strength of first sealant layer)/Yield strength of first sealant layer}×100.

17 Claims, 5 Drawing Sheets

(51) Int. Cl.
*H01M 50/119* (2021.01)
*H01M 50/121* (2021.01)
*H01M 50/124* (2021.01)
*H01M 50/126* (2021.01)
*H01M 50/129* (2021.01)
*H01M 50/133* (2021.01)

(52) U.S. Cl.
CPC ....... *H01M 50/121* (2021.01); *H01M 50/131* (2021.01); *H01M 50/133* (2021.01)

(56) References Cited

U.S. PATENT DOCUMENTS

| | | |
|---|---|---|
| 2016/0197318 A1 | 7/2016 | Yamashita et al. |
| 2016/0301040 A1 | 10/2016 | Takahagi et al. |
| 2017/0149026 A1 | 5/2017 | Yang et al. |
| 2018/0102514 A1 | 4/2018 | Dai et al. |
| 2021/0036271 A1* | 2/2021 | Lee ....................... B32B 27/281 |

FOREIGN PATENT DOCUMENTS

| | | |
|---|---|---|
| JP | 2014157727 A | 8/2014 |
| JP | 2014170720 A | 9/2014 |
| JP | 2015-050111 A | 3/2015 |
| JP | 2015050075 A | 3/2015 |
| JP | 2016081869 A | 5/2016 |
| JP | 2018032616 A | 3/2018 |
| JP | 2021-012877 A | 2/2021 |
| KR | 101132169 B1 | 4/2012 |
| KR | 101530590 B1 | 6/2015 |
| KR | 2018-0020082 A | 2/2018 |
| KR | 101983710 B1 | 6/2019 |
| WO | 03-001618 A1 | 1/2003 |
| WO | 2014178343 A1 | 11/2014 |
| WO | 2016199754 A1 | 12/2016 |
| WO | WO-2020179990 A1 * | 9/2020 ............... B32B 1/00 |

OTHER PUBLICATIONS

International Search Report for PCT/KR2022/014552 mailed Jan. 6, 2023. 4 pgs.

Written Opinion of the International Searching Authority for PCT/KR2022/014552 mailed Jan. 6, 2023. 3 pgs.

\* cited by examiner

POUCH FILM STACK AND SECONDARY BATTERY

CROSS-REFERENCE TO RELATED APPLICATIONS

The present application is a national phase entry under 35 U.S.C. § 371 of International Application No. PCT/KR2022/014552 filed Sep. 28, 2022, which claims priority from Korean Patent Application No. 10-2021-0131121, filed on Oct. 1, 2021, which are hereby incorporated by reference in their entirety.

TECHNICAL FIELD

The present invention relates to a pouch film stack and a secondary battery manufactured by forming same and, more specifically, to a pouch film stack, which enhances seal strength of a pouch, and a secondary battery manufactured by forming same.

BACKGROUND ART

In general, there are several types of secondary batteries, such as nickel cadmium batteries, nickel hydrogen batteries, lithium ion batteries, and lithium ion polymer batteries. These secondary batteries have been applied in and used for not only small products, such as digital cameras, P-DVDs, MP3Ps, cellular phones, PDAs, portable game devices, power tools, and E-bikes, but also large products requiring high power, such as electric vehicles and hybrid vehicles, as well as power storage devices or backup-power storage devices for storing surplus generated power and new renewable energy.

In order to manufacture the secondary batteries, first of all, electrode active material slurry is applied to a positive electrode collector and a negative electrode collector to manufacture a positive electrode and a negative electrode, and the positive electrode and the negative electrode are stacked on both sides of a separator to form an electrode assembly having a predetermined shape. Subsequently, the electrode assembly is accommodated in a battery case, and the battery case is sealed after an electrolyte is injected therein.

Secondary batteries are classified into a pouch type, a can type, or the like, according to a material of a case that accommodates the electrode assembly. In the pouch type, the electrode assembly is accommodated in a pouch made of a flexible polymer material. In the can type, the electrode assembly is accommodated in a case made of a metal, a plastic material, or the like.

The pouch of a pouch-type secondary battery is manufactured by forming a cup portion through press processing on a flexible pouch film stack. When the cup portion is formed, the electrode assembly is accommodated in an inner accommodation space of the cup portion and the sealing portion is sealed. Accordingly, the secondary battery may be manufactured.

In general, the pouch film stack includes a plurality of layers in which a polymer film such as polyethylene terephthalate is stacked on one surface of a metal gas barrier layer and a sealant layer is stacked on the other surface thereof. However, regarding the pouch film stack according to the related art, when the pouch-type secondary battery is in harsh environmental conditions, the sealing portion of the pouch may become vented. Accordingly, the electrode assembly accommodated inside the pouch may be contaminated or functionally disordered.

DISCLOSURE OF THE INVENTION

Technical Problem

The present invention provides a pouch film stack that improves seal strength of a pouch by optimizing yield strength of a sealant layer.

The objects of the present invention are not limited to the aforementioned objects, but other objects not described herein will be clearly understood by those skilled in the art from descriptions below.

Technical Solution

In a pouch film stack according to an embodiment of the present invention, a base layer, a gas barrier layer, and a sealant layer are stacked in that order. The sealant layer includes a first sealant layer located adjacent to the gas barrier layer and a second sealant layer stacked on the first sealant layer, wherein AY according to Equation (1) is 66% to 120%.

$$\Delta Y = \left\{ \left( \frac{\text{Yield strength of second sealant layer} - }{\text{Yield strength of first sealant layer}} \right) \middle/ \text{Yield strength of first sealant layer} \right\} \times 100 \quad \text{[Equation 1]}$$

In the pouch film stack according to the present invention, a difference between the yield strength of the first sealant layer and the yield strength of the second sealant layer may be less than or equal to 8 N/15 mm.

In the pouch film stack according to the present invention, the yield strength of the first sealant layer may be less than the yield strength of the second sealant layer.

In the pouch film stack according to the present invention, the yield strength of the first sealant layer may be 7 N/15 mm to 15 N/15 mm.

In the pouch film stack according to the present invention, the yield strength of the second sealant layer may be 10 N/15 mm to 30 N/15 mm.

In the pouch film stack according to the present invention, a thickness ratio between the first sealant layer and the second sealant layer may be 1:0.3 to 1:3.

In the pouch film stack according to the present invention, a thickness of the first sealant layer may be 10 μm to 60 μm.

In the pouch film stack according to the present invention, a thickness of the second sealant layer may be 20 μm to 70 μm.

In the pouch film stack according to the present invention, the first sealant layer and the second sealant layer may include polypropylene (PP), and the gas barrier layer may include aluminum (Al).

In the pouch film stack according to the present invention, peel strength between the gas barrier layer and the first sealant layer may be greater than 23 N/15 mm.

When a sealing portion is formed as the two pouch film stacks are stacked such that the second sealant layers thereof are in contact with each other, and are then sealed for 2 seconds under a condition of 180° C. and 0.4 Mpa, breaking strength of the sealing portion measured at 25° C. may be greater than or equal to 100 N/15 mm, and breaking strength of the sealing portion measured at 60° C. may be greater than or equal to 80 N/15 mm.

Also, a secondary battery according to another embodiment of the present invention includes a pouch-type battery case manufactured by forming any one of the pouch film stacks described above and an electrode assembly accommodated inside the pouch-type battery case.

Advantageous Effects

According to the related art, in order to improve adhesion with a gas barrier layer, which is a metal layer, when manufacturing a pouch film stack, a first sealant layer attached to the gas barrier layer is generally made of a material having lower flowability than a second sealant layer. However, in a battery case manufactured using the pouch film stack according to the related art, when gas is generated inside a pouch or an external force is applied, the interface between the first sealant layer and the second sealant layer is peeled off. Accordingly, seal durability becomes deteriorated.

In a pouch film stack according to the present invention desirably solves the above limitation, such that a difference in yield strength between a first sealant layer and a second sealant layer is controlled within a specific range. Accordingly, peeling at the interface between the first sealant layer and the second sealant layer due to the external force or gas generation may be suppressed. Therefore, seal durability of a pouch manufactured by sealing the pouch film stack may be improved.

MODE FOR CARRYING OUT THE INVENTION

Advantages and features of the present invention, and implementation methods thereof will be clarified through the following embodiments described in detail with reference to the accompanying drawings. The present invention may, however, be embodied in various different forms and should not be construed as limited to the embodiments set forth herein. Rather, these embodiments are provided so that this disclosure will be thorough and complete, and will fully convey the scope of the present invention to those skilled in the art to which the present invention belongs. Further, the present invention is defined only by scope of claims. Like reference numerals refer to like elements throughout.

Unless otherwise defined, all terms (including technical and scientific terms) used herein have the same meaning as commonly understood by one of ordinary skill in the art to which the present invention belongs. Also, terms as defined in a generally used dictionary are not construed ideally or excessively unless defined apparently and specifically.

The terms used in this specification are used only to explain embodiments while not limiting the present invention. In this specification, singular forms include the plural forms as well, unless the context clearly indicates otherwise. The meaning of "comprises" and/or "comprising" used in the specification does not exclude the presence or addition of one or more components other than the mentioned component.

Hereinafter, preferred embodiments of the present invention will be described in detail with reference to the accompanying drawings.

In addition, when it is stated that something "includes" some elements, it should be understood that it may include other elements as well unless explicitly described to the contrary.

In this specification, the top side of the drawing may be referred to as an "upper portion" or "upper side" of a component illustrated in the drawing, and the lower side may be referred to as a "lower portion" or "lower side." Also, a portion between an upper portion and a lower portion of a component illustrated in the drawing or a portion other than the upper portion and the lower portion may be referred to as a "side portion" or a "side surface." These relative terms such as "upper portion" and "upper side" may be used to describe relationships between components illustrated in the drawings, and the present disclosure is not limited by these terms.

In the specification, a direction toward the inner space of a structure may be referred to as "inside," and a direction protruding into an open outer space may be referred to as "outside." These relative terms such as "inside" and "outside" may be used to describe relationships between components illustrated in the drawings, and the present disclosure is not limited by these terms.

As used herein, the expression of "A and/or B" means A, B, or A and B.

In the specification, when one part is referred to as being connected to another part, this includes a case where the one part is directly connected to another part, but also a case where the one part is connected to another part with intervening elements therebetween.

In this specification, the yield strength represents a 0.2% off-set stress as the limit stress at which elastic deformation occurs. This is measured by pulling a 15 mm×80 mm polypropylene film sample at a speed of 50 mm/min in an environment of a temperature of 25° C. and a relative humidity of 40% using a measurement equipment UTM (Zwick).

In the specification, the breaking strength of a sealing portion represents stress at which the sealing portion is broken. Here, the sealing portion is formed as the two pouch film stacks are stacked such that second sealant layers thereof are in contact with each other, and are then sealed for 2 seconds under a condition of 180° C. and 0.4 Mpa. Specifically, the breaking strength of the sealing portion represents the maximum value of tensile strength measured when the sealing portion is broken. Here, a sample having the sealing portion is cut to a width of 15 mm, and ends of pouch film stacks stacked vertically in the sample are fastened to upper/lower jigs of the measurement equipment (UTM, Zwick) and are then pulled vertically at a speed of 5 mm/min.

Pouch Film Stack

A pouch film stack according to the present invention has a base layer, a gas barrier layer, and a sealant layer which are stacked in that order. In this case, the sealant layer includes a first sealant layer located adjacent to the gas barrier layer and a second sealant layer stacked on the first sealant layer. Also, ΔY according to Equation (1) is 66% to 120%.

$$\Delta Y = \{(\text{Yield strength of second sealant layer} - \text{Yield strength of first sealant layer})/\text{Yield strength of first sealant layer}\} \times 100 \qquad [\text{Equation 1}]$$

Hereinafter, referring to FIG. 1, a pouch film stack according to the present invention and each of the layers included in the pouch film stack will be described in detail.

Figure 1:
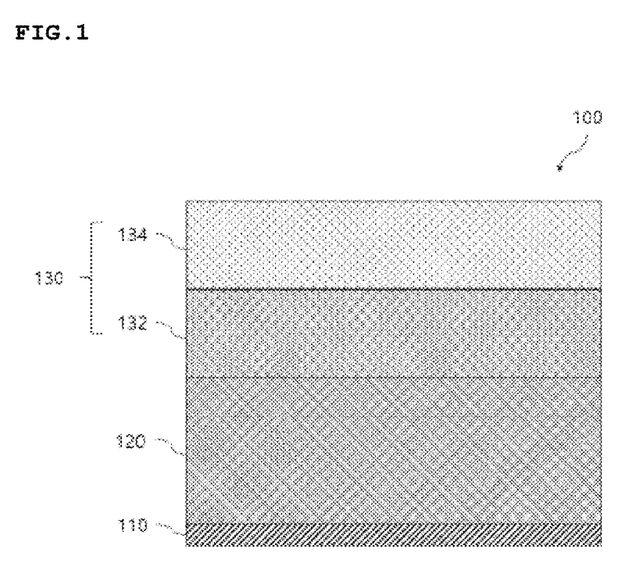
FIG. 1 is a cross-sectional view of a pouch film stack according to the present invention.

FIG. 1 is a cross-sectional view of a pouch film stack 100 according to the present invention.

As illustrated in FIG. 1, the pouch film stack 100 includes a base layer 110, a gas barrier layer 120, and a sealant layer 130. The sealant layer 130 includes a first sealant layer 132 and a second sealant layer 134. In the pouch film stack 100, the base layer 110, the gas barrier layer 120, the first sealant layer 132, and the second sealant layer 134 may be stacked in that order.

(1) Base Layer

The base layer 110 is formed on the outermost layer of the pouch film stack 100 to protect a secondary battery from external friction and collision. The base layer 110 may be made of a polymer to electrically insulate an electrode assembly from the outside. The base layer 110 may include one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. Among the above materials, it is particularly preferable that the base layer 110 is made of polyethylene terephthalate (PET), nylon, or a combination thereof having wear resistance and thermal resistance.

The base layer 110 may have a single layer structure made of any one material. On the other hand, the base layer 110 may have a composite layer structure in which two or more materials constitute respective layers.

The base layer 110 may have a thickness of 5 µm to 50 µm, preferably 7 µm to 50 µm, and more preferably 7 µm to 40 µm. When the thickness of the base layer 110 satisfies the above ranges, the pouch film stack may have excellent external insulation properties. In addition, since the entire pouch is not thick, the energy density with respect to the volume of the secondary battery may be excellent.

(2) Gas Barrier Layer

The gas barrier layer 120 is stacked between the base layer 110 and the sealant layer 130 to secure the mechanical strength of a pouch. The gas barrier layer 120 blocks the entry of gas or moisture from the outside of a pouch-type battery case, and it prevents an electrolyte from leaking from the inside of the pouch-type battery case.

The gas barrier layer 120 may be made of metal, and may be specifically made of an aluminum alloy thin film. When the gas barrier layer is made by using the aluminum alloy thin film, the weight thereof may be reduced while securing mechanical strength of a certain level or higher. In addition, it is possible to secure heat dissipation and supplement the electrochemical properties of the electrode assembly and the electrolyte. The aluminum alloy thin film may include metal elements other than aluminum. For example, the thin film may include one or two or more selected from the group consisting of iron (Fe), copper (Cu), chrome (Cr), manganese (Mn), nickel (Ni), magnesium (Mg), silicon (Si), and zinc (Zn).

Also, the gas barrier layer 120 may have a thickness of 40 µm to 100 µm, preferably 50 µm to 90 µm, and more preferably 55 µm to 85 µm. When the thickness of the gas barrier layer 120 satisfies the above range, the formability during forming of a cup portion and the performance of the gas barrier become excellent.

(3) Sealant Layer

The function of the sealant layer 130 is to completely seal the inside of the pouch-type battery case from the outside. Here, when a pouch-type battery case 310 (FIG. 3) accommodating an electrode assembly therein is sealed, sealing portions 350 (FIG. 3) are thermally bonded to each other. To this end, the sealant layer 130 may be made of a material having excellent thermal bonding strength.

The sealant layer 130 may have a composite layer structure in which two or more materials constitute respective layers.

Specifically, the sealant layer 130 according to the present invention may include the first sealant layer 132 and the second sealant layer 134. In this case, the first sealant layer 132 may be a layer located adjacent to the gas barrier layer 120, and the second sealant layer 134 may be a layer disposed on the first sealant layer 132. The first sealant layer 132 and the second sealant layer 134 may be made of materials having different material properties and/or physical properties.

An interface may be present between the first sealant layer 132 and the second sealant layer 134. This means that the first sealant layer 132 and the second sealant layer 134 are different layers, and also means that these layers may be formed separately.

According to the present invention, ΔY according to Equation 1 below may be 66% to 120%, preferably 66% to 110%, and more preferably 66% to 100%. Here, ΔY represents, as a percentage, a difference between the yield strength of the first sealant layer 132 and the yield strength of the second sealant layer 134 with respect to the yield strength of the first sealant layer 132.

$$\Delta Y = \left\{ \left( \frac{\text{Yield strength of second sealant layer} - \text{Yield strength of first sealant layer}}{\text{Yield strength of first sealant layer}} \right) \right\} \times 100 \qquad [\text{Equation 1}]$$

When ΔY is greater than 120%, the possibility of interlayer peeling at the interface between the first sealant layer 132 and the second sealant layer 134 increases when an external force or gas is generated. Accordingly, seal durability of the pouch-type battery case 310 (FIG. 3) may be deteriorated.

When ΔY is less than 66%, the extrusion processability of the sealant layer is deteriorated during manufacture of the pouch film stack. Accordingly, in a sealing process for manufacturing a battery after manufacturing the pouch film stack, low-temperature sealing performance may be deteriorated.

The difference in yield strength between the first sealant layer 132 and the second sealant layer 134 may be 8 N/15 mm or less, preferably 1 N/15 mm to 8 N/15 mm, and more preferably 3 N/15 mm to 7 N/15 mm. When the difference in yield strength between the first sealant layer 132 and the second sealant layer 134 satisfies the above range, the possibility of interlayer peeling at the interface between the first sealant layer 132 and the second sealant layer 134 decreases when an external force or gas is generated. Accordingly, seal durability of the pouch-type battery case 310 (FIG. 3) may be enhanced.

The yield strength of the first sealant layer 132 may be less than the yield strength of the second sealant layer 134. In this case, the first sealant layer 132 has lower flowability than the second sealant layer 134 and thus may be easily attached to the gas barrier layer 120 when forming the pouch film stack 100. In addition, when an external force is generated, the adhesive force on the interface between the gas barrier layer 120 and the first sealant layer 132 may be maintained at a high level.

The first sealant layer 132 and the second sealant layer 134 may include materials having different material properties and/or physical properties. For example, the first sealant layer 132 may be made of a material having lower flowability than the second sealant layer 134. In such case, the first sealant layer 132 having low flowability may have a lower yield strength than the second sealant layer 134.

The thickness ratio between the first sealant layer 132 and the second sealant layer 134 may be 1:0.3 to 1:3, preferably 1:0.6 to 1:2.2, more preferably 1:1 to 1:1.7. When the thickness ratio between the first sealant layer 132 and the second sealant layer 134 satisfies the above range, the extrusion processability between the gas barrier layer 120 and the sealant layer 130 may be secured. At the same time, the breaking strength of the sealing portion may be enhanced.

Hereinafter, each of the first sealant layer 132 and the second sealant layer 134 mentioned above will be described in detail.

1) First Sealant Layer

As described above, the first sealant layer 132 may be a layer located adjacent to the gas barrier layer 120.

The first sealant layer 132 may be made of a polymer material. Specifically, the first sealant layer 132 may be made of one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber, and may be preferably made of polyolefin-based resin such as polypropylene (PP) and/or polyethylene (PE). In this case, the polypropylene may include cast polypropylene (CPP), acid modified polypropylene (PPa), or polypropylene-butylene-ethylene terpolymer.

It is particularly preferable that the first sealant layer 132 is made of the acid modified polypropylene (PPa) in order to secure long-term adhesion performance between the gas barrier layer 120 and the first sealant layer 132. Here, the acid modified polypropylene may include maleic anhydride polypropylene (MAH PP).

In order to adjust the yield strength of the first sealant layer 132 to a desired value, an additive may be added to the polymer material that constitutes the first sealant layer 132. For example, as the additive for enhancing the yield strength of the first sealant layer 132, at least one of carbon fiber, glass fiber, or aramid fiber may be added. For example, the additive may be included in an amount of about 5% to about 8% by volume based on the total volume of the first sealant layer 132, but is not limited thereto.

The yield strength of the first sealant layer 132 may be 7 N/15 mm to 15 N/15 mm, preferably 7.2 N/15 mm to 9.0 N/15 mm, and more preferably 7.5 N/15 mm to 8.5 N/15 mm.

When the yield strength of the first sealant layer 132 is less than 7 N/15 mm, the difference in yield strength between the first sealant layer 132 and the second sealant layer 134 increases. Accordingly, interlayer peeling at the interface between the first sealant layer 132 and the second sealant layer 134 occurs when an external force or gas is generated, and the seal durability of the pouch-type battery case 310 (FIG. 3) may be deteriorated.

When the yield strength of the first sealant layer 132 is greater than 15 N/15 mm, extrusion processability for laminating the gas barrier layer 120 and the first sealant layer 132 may be deteriorated. In addition, in order to increase the yield strength of the first sealant layer 132, overall strength of the sealant layer 130 needs to be enhanced. To this end, when the first sealant layer 132 and the second sealant layer 134 are extruded, a necking phenomenon may occur. Furthermore, the difference between the yield strength of the first sealant layer 132 and the yield strength of the gas barrier layer 120 increases, and thus, the adhesive force at the interface between the gas barrier layer 120 and the first sealant layer 132 may be deteriorated.

The first sealant layer 132 may have a thickness of 10 μm to 60 μm, preferably 20 μm to 50 μm, and more preferably 30 μm to 40 μm. When the thickness of the first sealant layer 132 is less than 10 μm, the sealing durability and insulating characteristics of a sealing portion 350 (FIG. 3) are deteriorated. In addition, the yield strength of the first sealant layer 132 is decreased, and thus, the seal strength of the sealing portion 350 (FIG. 3) is deteriorated. When the thickness of the first sealant layer 132 is greater than 60 μm, the entire thickness of a pouch film stack is excessively increased, resulting in deterioration in formability. In addition, in the pouch-type battery case manufactured by forming the pouch film stack, an accommodation space 324 (FIG. 3) for an electrode assembly is reduced, and thus, the energy density with respect to the volume of a secondary battery may be deteriorated.

2) Second Sealant Layer

As described above, the second sealant layer 134 may be a layer disposed on the first sealant layer 132.

The second sealant layer 134 may be made of a material having insulating characteristics, corrosion resistance, and sealing performance. Specifically, referring to FIG. 3, the second sealant layer 134 directly contacts an electrode assembly 360 (FIG. 3) and/or an electrolyte inside an accommodation space 324 (FIG. 3), and thus may be made of a material having the insulating characteristics and corrosion resistance. In addition, the second sealant layer 134 has to completely seal the inside of the pouch-type battery case to block material transfer between the inside and outside, and thus may be made of a material having high sealing performance (e.g., excellent thermal bonding strength).

In order to secure the insulating characteristics, corrosion resistance, and sealing performance, the second sealant layer 134 may be made of a polymer material. Specifically, the second sealant layer 134 may be made of one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. Preferably, the second sealant layer 134 may be made of polyolefin-based resin such as polypropylene (PP) and/or polyethylene (PE). In this case, the polypropylene may include cast polypropylene, acid modified polypropylene, or polypropylene-butylene-ethylene terpolymer. Here, the acid modified polypropylene may include maleic anhydride polypropylene (MAH PP). More preferably, the second sealant layer 134 may be made of the cast polypropylene having heat sealability and high tensile strength.

In order to adjust the yield strength of the second sealant layer 134 to a desired value, an additive may be added to the polymer material that constitutes the second sealant layer 134. For example, as the additive for enhancing the yield strength of the second sealant layer 134, at least one of carbon fiber, glass fiber, or aramid fiber may be added.

The yield strength of the second sealant layer 134 may be 10 N/15 mm to 30 N/15 mm, preferably 12 N/15 mm to 17 N/15 mm, and more preferably 14 N/15 mm to 16 N/15 mm. When the yield strength of the second sealant layer 134 is less than 10 N/15 mm, breakage may occur along a pair of sealed second sealant layers 134 when an external force or gas is generated. Accordingly, the seal durability of the pouch-type battery case 310 (FIG. 3) may be deteriorated. When the yield strength of the second sealant layer 134 is greater than 30 N/15 mm, the difference between the yield strength of the second sealant layer 134 and the yield strength of the first sealant layer 132 increases. Accordingly, the risk of peeling at the interface between the first sealant layer 132 and the second sealant layer 134 may increase.

The second sealant layer 134 may have a thickness of 20 μm to 70 μm, preferably 30 μm to 70 μm, and more preferably 40 μm to 60 μm. When the thickness of the second sealant layer 134 is less than 20 μm, the sealing durability and insulating characteristics of a sealing portion 350 (FIG. 3) are deteriorated. In addition, the yield strength of the second sealant layer 134 is decreased, and thus, the seal strength of the sealing portion 350 (FIG. 3) is deteriorated. When the thickness of the second sealant layer 134 is greater than 70 μm, the entire thickness of a pouch film stack is excessively increased, resulting in deterioration in formability. In addition, in the pouch-type battery case manufactured by forming the pouch film stack, an accommodation space 324 (FIG. 3) for an electrode assembly is reduced, and thus, the energy density with respect to the volume of a secondary battery may be deteriorated.

Figure 2:
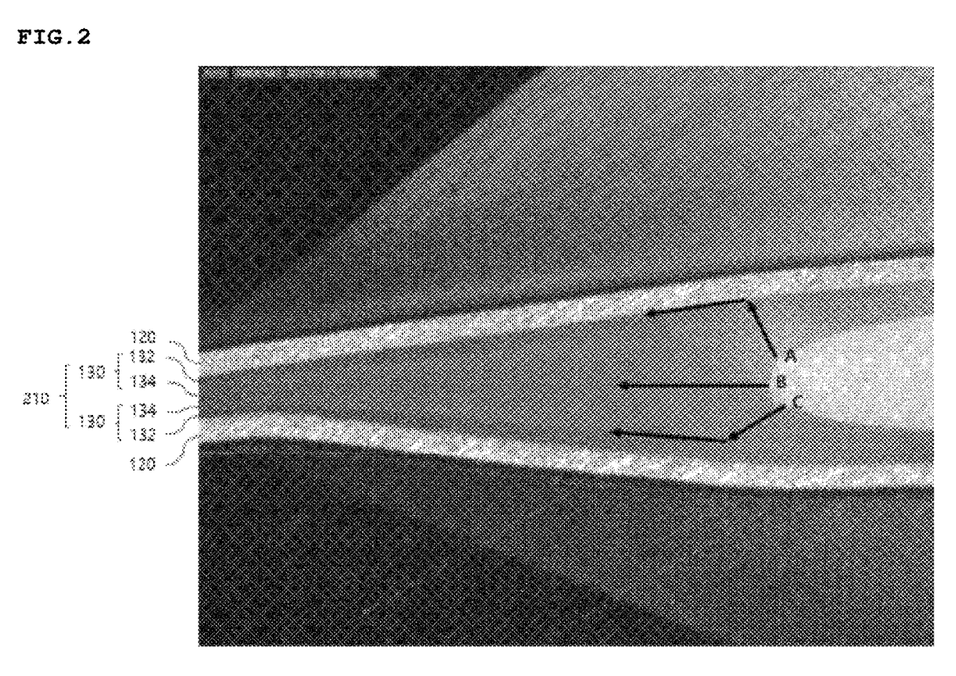
FIG. 2 is a cross-sectional view illustrating a sealing portion of a pouch-type battery case according to the present invention.

Next, FIG. 2 is a cross-sectional view illustrating a sealing portion 210 of a pouch-type battery case according to the present invention.

As illustrated in FIG. 2, a battery case manufactured by forming a pouch film stack may be sealed after second sealant layers 134 are brought into contact with and stacked on each other. In this case, the sealing portion 210 may include one or more sealant layers 130.

When pressure is applied to the sealed battery case due to an external force or generation of gas, peeling may occur at the interface between having relatively weak adhesion. For example, the peeling may occur along the interface between the gas barrier layer 120 and the first sealant layer 132 (e.g., a path A of FIG. 2), the interface between the second sealant layers 134 thermally bonded to each other (e.g., a path B of FIG. 2), and/or the interface between the first sealant layer 132 and the second sealant layer 134 (e.g., a path C of FIG. 2).

However, the battery case manufactured using the pouch film stack according to the present invention has excellent adhesive force at all three interfaces and thus exhibits excellent seal strength.

Specifically, in the pouch film stack according to the present invention, the yield strength of the first sealant layer 132 has a value similar to that of the gas barrier layer 120. Therefore, when an external force is generated, the adhesive force on the interface between the gas barrier layer 120 and the first sealant layer 132 is maintained high, and peeling therebetween is suppressed. For example, the peel strength between the gas barrier layer 120 and the first sealant layer 132 may be greater than 23 N/15 mm, preferably greater than or equal to 23.2 N/15 mm, and more preferably greater than or equal to 23.5 N/15 mm. When the peel strength between the gas barrier layer 120 and the first sealant layer 132 satisfies the above range, peeling at the interface between the gas barrier layer 120 and the first sealant layer 132 may be suppressed.

In addition, the yield strength of the second sealant layer 134 formed on the sealing portion 210 is high, and thus, a high restoring force acts when an external force is generated. Therefore, peeling at the interface between the second sealant layers 134 that are thermally bonded to each other may be suppressed.

In addition, the difference in yield strength between the first sealant layer 132 and the second sealant layer 134 is small, interlayer peeling at the interface between the first sealant layer 132 and the second sealant layer 134 may be suppressed.

According to an embodiment of the present invention, the sealing portion 210 is formed as the two pouch film stacks are stacked such that second sealant layers 134 thereof are in contact with each other, and are then sealed for 2 seconds under a condition of 180° C. and 0.4 Mpa.

For example, breaking strength of the sealing portion 210 measured at 25° C. may be 100 N/15 mm or more, preferably 110 N/15 mm or more, and more preferably 120 N/15 mm or more.

Also, breaking strength of the sealing portion 210 measured at 60° C. may be 80 N/15 mm or more, preferably 90 N/15 mm or more, and more preferably 100 N/15 mm or more.

When the breaking strength of the sealing portion 210 at 25° C. is less than 100 N/15 mm or when the breaking strength of the sealing portion 210 at 60° C. is less than 80 N/15 mm, the seal strength of the sealing portion 210 is low. Thus, the sealed battery case is easily vented by external force or gas generation.

The breaking strength of the sealing portion 210 represents the maximum value of tensile strength measured when the sealing portion is broken. Here, ends of pouch film stacks stacked vertically in a sample having the sealing portion 210 are fastened to upper/lower jigs of the measurement equipment UTM and then pulled vertically at a speed of 5 mm/min. Also, the "25° C." and the "60° C." represent the temperature when the end of each of the pouch film stacks 100 adjacent to each other is pulled vertically.

Secondary Battery

Next, a secondary battery according to the present invention will be described.

Figure 3:
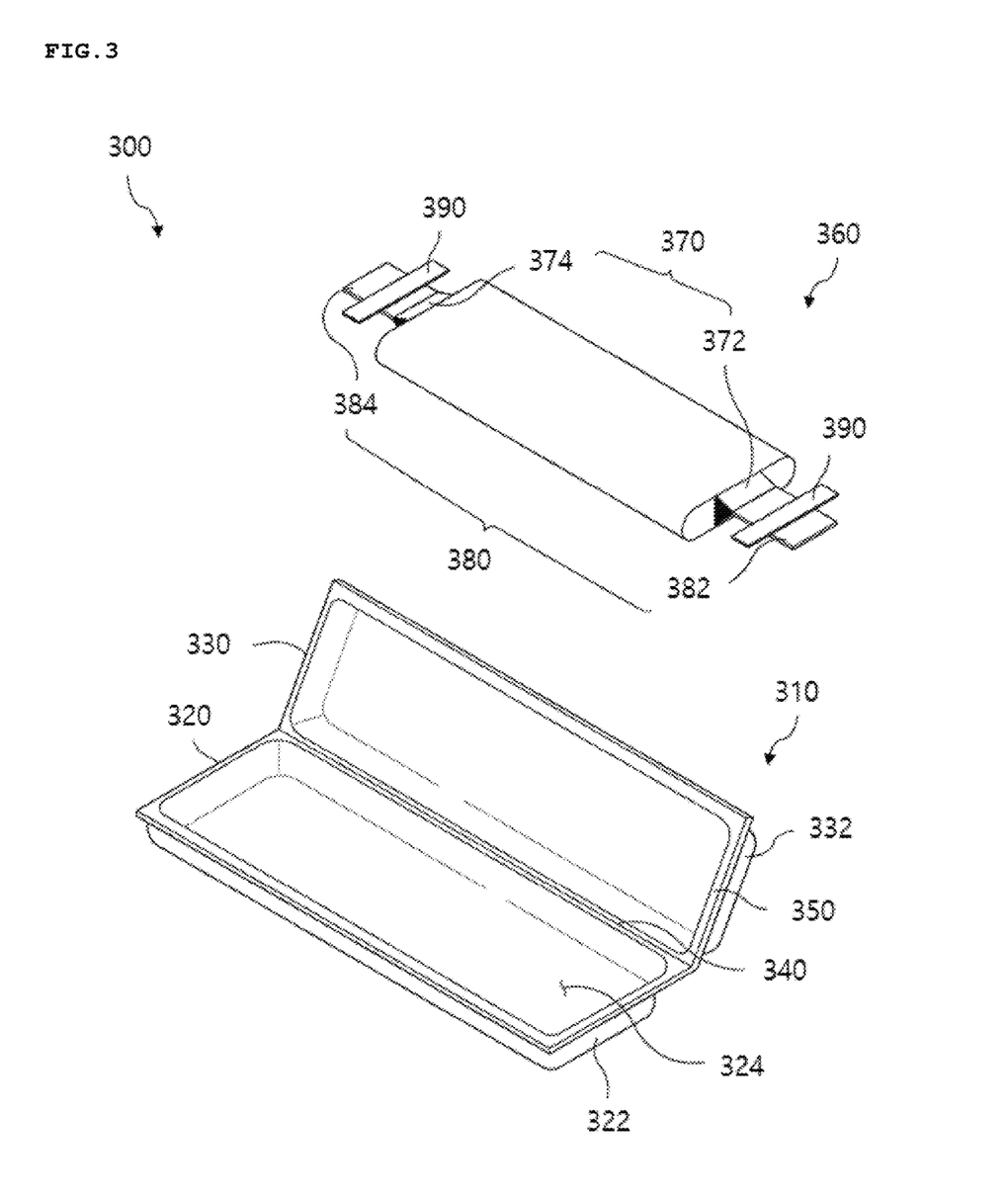
FIG. 3 is an exploded assembly view of a secondary battery according to the present invention.

FIG. 3 is an exploded assembly view of a secondary battery 300 according to the present invention.

As illustrated in FIG. 3, the secondary battery 300 according to the present invention may include a pouch-type battery case 310 and an electrode assembly 360 accommodated in the pouch-type battery case 310. The electrode assembly 360 may be formed by stacking a positive electrode, a separator, and a negative electrode, and may include an electrode tab 370, an electrode lead 380, and an insulating part 390. Electrolyte is injected in a state where the electrode assembly 360 is accommodated inside the pouch-type battery case 310, and then a sealing portion 350 is sealed. Accordingly, the secondary battery 300 may be manufactured.

The pouch-type battery case 310 may accommodate the electrode assembly 360 therein. The pouch-type battery case 310 may be manufactured by forming the pouch film stack 100 illustrated above in FIG. 1. The detailed configuration and physical properties of the pouch film stack 100 are the same as those described above, and thus, a detailed description thereof will be omitted.

In order to manufacture the pouch-type battery case 310, a pouch-type film stack 100 is drawn and stretched by a punch or the like. Accordingly, a cup portion 322 including an accommodation space 324 in the form of a bag to accommodate the electrode assembly 360 may be formed.

As illustrated in FIG. 3, the pouch-type battery case 310 may include a first case 320 and a second case 330. In an embodiment, the first case 320 may have the cup portion 322 and include the accommodation space 324 capable of accommodating the electrode assembly 360, and the second case 330 may cover the accommodation space 324 from above so as to prevent the electrode assembly 360 from moving out from the battery case 310. The first case 320 and the second case 330 may be manufactured such that the respective sides thereof are connected to each other as illustrated in FIG. 3 (e.g., the reference numeral 340), but the embodiment is not limited thereto. These cases may be diversely manufactured, for example, individually manufactured and separated from each other.

In another embodiment, when the cup portion 322 is formed in the pouch film stack 100, two symmetrical cup portions 322 and 332 may be drawn to be adjacent to each other in one pouch film stack 100. In this case, the cup portions 322 and 332 may be formed in the first case 320 and the second case 330, respectively, as illustrated in FIG. 3. After the electrode assembly 360 is accommodated in the accommodation space 324 provided in the cup portion 322 of the first case 320, a bridge portion 340 formed between the two cup portions 322 and 332 may be folded such that the two cup portions 322 and 332 face each other. In this case, the cup portion 332 of the second case 330 may accommodate the electrode assembly 360 from above. Thus, the two cup portions 322 and 332 accommodate one electrode assembly 360, and thus, a thicker electrode assembly 360 may be accommodated compared to when only one cup portion 322 is provided. In addition, since one edge of the secondary battery 300 is formed by folding the pouch-type battery case 310, the number of edges to be sealed may be reduced when a sealing process is performed later. Accordingly, the process speed of the secondary battery 300 may be enhanced, and the number of sealing processes may be reduced.

The pouch-type battery case 310 may be sealed in a state in which the electrode assembly 360 is accommodated such that a portion of an electrode lead 380, i.e., a terminal part is exposed. Specifically, the electrode lead 380 is connected to an electrode tab 370 of the electrode assembly 360, and the insulating part 390 is formed on a portion of the electrode lead 380. Then, the electrode assembly 360 may be accommodated in the accommodation space 324 provided in the cup portion 322 of the first case 320, and the second case 330 may cover the accommodation space 324 from above. Subsequently, an electrolyte may be injected into the accommodation space 324, and sealing portions 350 formed at the edges of the first case 320 and the second case 330 may be sealed. The purpose of the electrolyte is to move lithium ions generated by an electrochemical reaction of the electrode during charging/discharging of the secondary battery 300, and the electrolyte may include a non-aqueous organic electrolyte that is a mixture of a lithium salt and an organic solvent, or may include a polymer using a polymer electrolyte. Furthermore, the electrolyte may include a sulfide-based, oxide-based, or polymer-based solid electrolyte, and the solid electrolyte may be flexible enough to be easily deformed by an external force.

Next, the electrode assembly 360 may be formed by alternately stacking electrodes and separators. Specifically, slurry, in which an electrode active material, a binder, and/or a conductive material are mixed, is applied to a positive electrode collector and a negative electrode collector to manufacture a positive electrode and a negative electrode. Then, these electrodes are stacked on both sides of a separator to form the electrode assembly 360 having a certain shape. The electrode assembly 360 may be inserted into the pouch-type battery case 310 and sealed by the pouch-type battery case 310 after injection of the electrolyte. In an embodiment, types of the electrode assembly 360 may include a stack type, a jelly roll type, a stack and folding type, and the like, but the embodiment is not limited thereto.

In an embodiment, the electrode assembly 360 may include two types of electrodes, such as a positive electrode and a negative electrode, and a separator interposed between the electrodes to insulate the electrodes from each other. Each of the positive electrode and the negative electrode may have a structure in which active material slurry is applied to an electrode collector in the form of a metal foil or metal mesh including aluminum and copper. Generally, the slurry may be formed by stirring granular active materials, auxiliary conductors, binders, conductive materials, and the like in a state in which a solvent is added. The solvent may be removed in a subsequent process.

The electrode tab 370 is connected to each of the positive electrode and the negative electrode of the electrode assembly 360, and protrudes outward from the electrode assembly 360, thereby serving as a path through which electrons can move between the inside and the outside of the electrode assembly 360. The electrode collector of the electrode assembly 360 may include a portion coated with the electrode active material and an end portion, that is, a non-coating portion not coated with the electrode active material. The electrode tab 370 may be formed by cutting the non-coating portion or formed by connecting a separate conductive member to the non-coating portion using ultrasonic welding or the like. The electrode tabs 370 may protrude in different directions of the electrode assembly 360 as illustrated in FIG. 3, but the embodiment is not limited thereto. The electrode tabs may protrude in various directions, for example, may protrude side by side from one side in the same direction.

The electrode lead 380 may supply electricity to the outside of the secondary battery 300. The electrode lead 380 may be connected to the electrode tab 370 of the electrode assembly 360 through spot welding or the like. At least a portion of the electrode lead 380 may be surrounded by the insulating part 390. In an embodiment, one end of the electrode lead 380 may be connected to the electrode tab 370, and the other end may protrude outward from battery case 310. The electrode lead 380 may include a positive electrode lead 382, which has one end connected to a positive electrode tab 372 and extends in a direction in which the positive electrode tab 372 protrudes, and a negative electrode lead 384, which has one end connected to a negative electrode tab 374 and extends in a direction in which the negative electrode tab 374 protrudes.

The other ends of both the positive electrode lead 382 and the negative electrode lead 384 may protrude outward from the battery case 310. Therefore, the electricity generated inside the electrode assembly 360 may be supplied to the outside. Also, since the positive electrode tab 372 and the negative electrode tab 374 protrude in various directions, the positive electrode lead 382 and the negative electrode lead 384 may also extend in various directions. In an embodiment, the positive electrode lead 382 and the negative electrode lead 384 may be made of materials different from each other. That is, the positive electrode lead 382 may have the same aluminum (Al) material as the positive electrode collector, and the negative electrode lead 384 may have the same copper (Cu) material or nickel (Ni)-coated copper material as the negative electrode collector. A portion of the electrode lead 380 protruding outward from the battery case 310 serves as a terminal part and may be electrically connected to an external terminal.

In a state in which the position of the insulating part 390 is limited within the sealing portion 350 at which the first case 320 and the second case 330 of the pouch-type battery case 310 are to be thermally fused, the electrode lead 380 may be bonded to the battery case 310. Also, the insulating part 390 may prevent the electricity generated from the electrode assembly 360 from flowing to the battery case 310 via the electrode lead 380, and maintain the sealing of the battery case 310. To this end, the insulating part 390 may be made of a non-conductor having non-conductivity through which the electricity does not flow well. In general, although relatively thin insulating tape easily attached to the electrode lead 380 is widely used as the insulating part 390, the embodiment is not limited thereto. Various members may be used as long as these members are capable of insulating the electrode lead 380.

Hereinafter, the present invention will be described in detail with reference to specific embodiments. However, the following embodiments are only examples to help understanding of the present invention, and do not limit the scope of the present invention. It will be apparent to those skilled in the art that various modifications and variations can be made within the scope and technical ideas of the present disclosure, and all such modifications and variations are included in the appended claims.

EMBODIMENT AND COMPARATIVE EXAMPLE

Embodiment 1 (Manufacture of Pouch Film Stack)

A pouch film stack was manufactured which has a structure of polyethylene terephthalate/nylon/aluminum alloy thin film/acid modified polypropylene/cast polypropylene. Here, a polyethylene terephthalate film having a width of 266 mm, a length of 50 m, and a thickness of 12 μm, and a nylon film having a width of 266 mm, a length of 50 m, and a thickness of 25 μm are stacked on one surface of an aluminum alloy thin film having a width of 266 mm, a length of 50 m, and a thickness of 60 μm. Also, an acid modified polypropylene (PPa) having a width of 266 mm, a length of 50 m, and a thickness of 30 μm, and a cast polypropylene (CPP) having a width of 266 mm, a length of 50 m, and a thickness of 50 μm are stacked on the other surface of the aluminum alloy thin film.

Here, a carbon fiber additive capable of enhancing yield strength was added at 8 vol % to the acid modified polypropylene. The acid modified polypropylene was melted at a high temperature and then extruded and stacked on the aluminum alloy thin film and the cast polypropylene.

Here, the polyethylene terephthalate and the nylon represent a base layer, the aluminum alloy thin film represents a gas barrier layer, and the acid modified polypropylene represents a first sealant layer, and the cast polypropylene represents a second sealant layer.

Embodiment 2 (Manufacture of Pouch Film Stack)

A pouch film stack was manufactured in the same manner as in Embodiment 1, except that a carbon fiber additive capable of enhancing yield strength was added at 5 vol % to the first sealant layer.

Comparative Example 1 (Manufacture of Pouch Film Stack)

A pouch film stack was manufactured in the same manner as in Embodiment 1, except that an additive capable of enhancing yield strength was not added to the first sealant layer.

Comparative Example 2 (Manufacture of Pouch Film Stack)

A pouch film stack was manufactured in the same manner as in Comparative Example 1, except that a thickness of the first sealant layer was 20 μm.

Comparative Example 3 (Manufacture of Pouch Film Stack)

A pouch film stack was manufactured in the same manner as in Comparative Example 1, except that a carbon fiber additive capable of enhancing yield strength was added at 10 vol % to the first sealant layer.

The material and thickness of each layer of the pouch film stack manufactured in each of Embodiments 1-2 and Comparative Examples 1-3 are shown in Table 1 below.

TABLE 1

| | Base layer | | Gas barrier layer | | First sealant layer | | Second sealant layer | |
|---|---|---|---|---|---|---|---|---|
| | Material | Thickness (μm) | Material | Thickness (μm) | Material | Thickness (μm) | Material | Thickness (μm) |
| Embodiment 1 | PET Nylon | 12 25 | Al alloy | 60 | PPa + Carbon fiber 8 vol % | 30 | CPP | 50 |
| Embodiment 2 | PET Nylon | 12 25 | Al alloy | 60 | PPa + Carbon fiber 5 vol % | 30 | CPP | 50 |

TABLE 1-continued

|  | Base layer | | Gas barrier layer | | First sealant layer | | Second sealant layer | |
|---|---|---|---|---|---|---|---|---|
|  | Material | Thickness (μm) | Material | Thickness (μm) | Material | Thickness (μm) | Material | Thickness (μm) |
| Comparative Example 1 | PET Nylon | 12 25 | Al alloy | 60 | PPa | 30 | CPP | 50 |
| Comparative Example 2 | PET Nylon | 12 25 | Al alloy | 60 | PPa | 20 | CPP | 50 |
| Comparative Example 3 | PET Nylon | 12 25 | Al alloy | 60 | PPa + Carbon fiber 10 vol % | 30 | CPP | 50 |

Experimental Example 1: Measurement of Yield Strength of Sealant Layer

In Examples or Comparative Examples, resin constituting each of the first sealant layer and the second sealant layer was extruded in the form of a film, and then a strain-stress curve was measured. Also, yield strength of each of the first sealant layer and the second sealant layer was measured. In addition, ΔY according to Equation 1 was calculated using the measured yield strength. The yield strength and a value of ΔY are shown in Table 2 below.

$$\Delta Y = \left\{ \left( \frac{\text{Yield strength of second sealant layer} - \text{Yield strength of first sealant layer}}{\text{Yield strength of first sealant layer}} \right) \right\} \times 100 \quad \text{[Equation 1]}$$

Experimental Example 2: Evaluation of Peel Strength Between Gas Barrier Layer and Sealant Layer For the pouch film stack manufactured in each of Examples and Comparative Examples, peel strength between the gas barrier layer and the sealant layer was measured.

Figure 4:
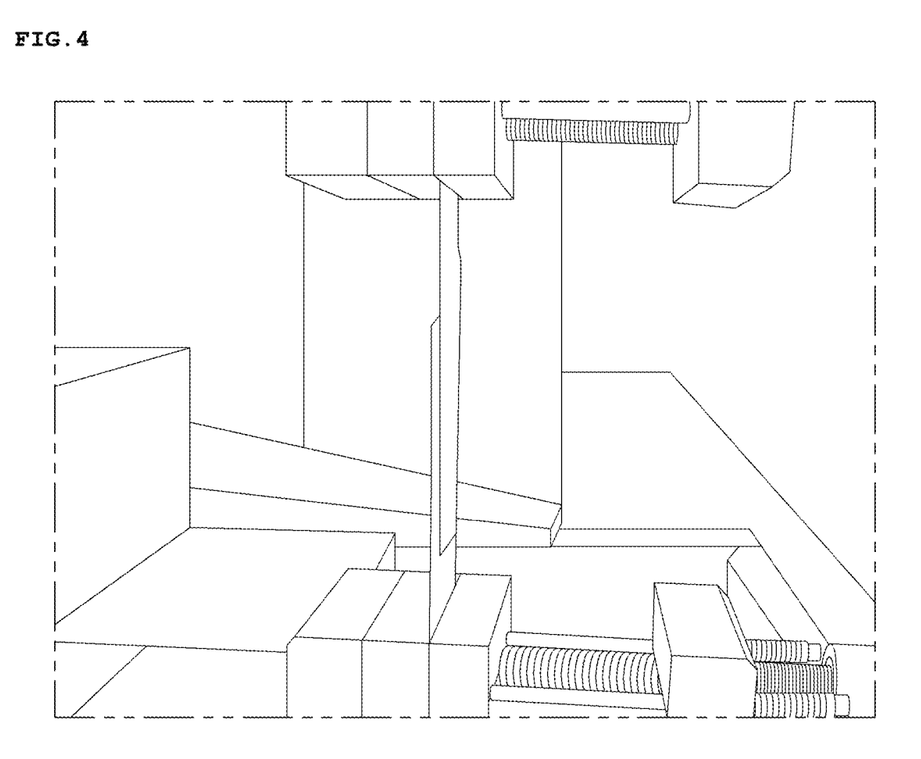
FIG. 4 shows a state in which peel strength between a gas barrier layer and a sealant layer according to the present invention is being measured.

Specifically, as illustrated in FIG. 4, 180 degree peel strength was measured by peeling the sealant layer from the pouch film stack manufactured in each of Examples and Comparative Examples. In addition, the average value of the strength of the flat section of 5 to 25 mm was measured. The measurement results are shown in Table 2 below.

FIG. 4 shows a state in which peel strength between a gas barrier layer and a sealant layer according to the present invention is being measured.

Experimental Example 3: Evaluation Whether Interlayer Peeling Between First Sealant Layer and Second Sealant Layer Occurs When measuring the peel strength of the gas barrier layer/the sealant layer in Experimental Example 2, it was visually checked whether interlayer peeling between the first sealant layer and the second sealant layer had occurred. The measurement results are shown in Table 2 below.

Experimental Example 4: Evaluation of Breaking Strength of Sealing Portion

Figure 5:
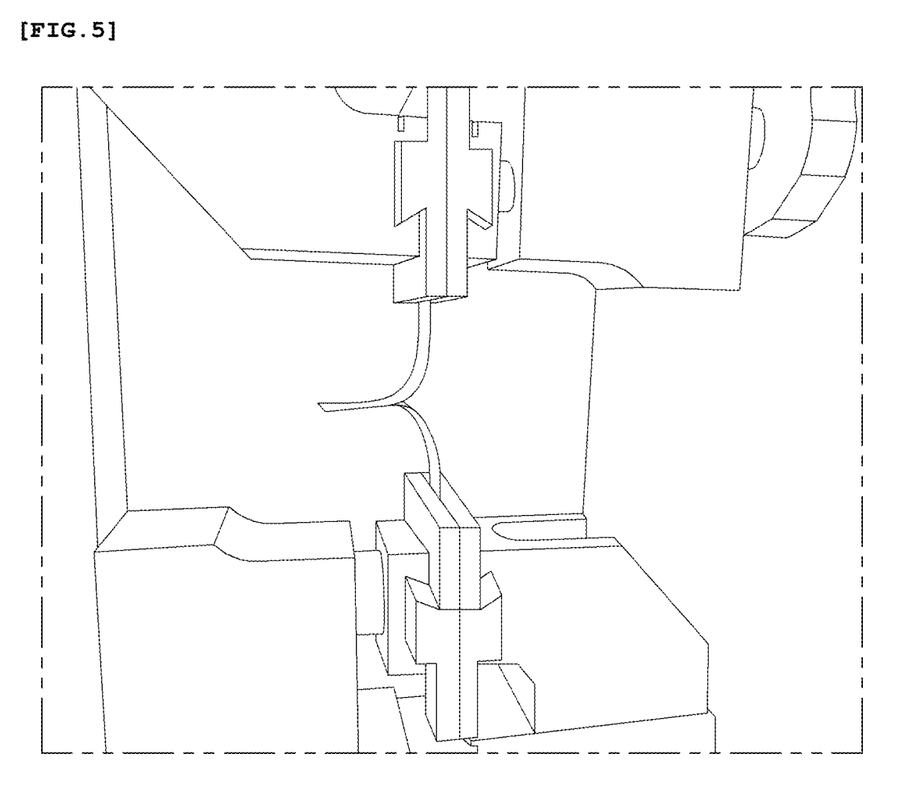
FIG. 5 shows a state in which breaking strength of a sealing portion manufactured by using the pouch film stack according to the present invention is being measured.

Two pouch film stacks manufactured in each of Embodiments and Comparative Examples were stacked such that the second sealant layers thereof are in contact with each other. Subsequently, the sealant layers were sealed for 2 seconds under the conditions of a seal bar area of 200 mm×10 mm, 180° C., and 0.4 MPa, thereby forming a sealing portion. Then, the sealed sample was cut to a width of 15 mm. Finally, as illustrated in FIG. 5, ends of pouch film stacks stacked vertically in the cut sample were fastened to upper/lower jigs of the measurement equipment (UTM, Zwick) and pulled vertically at a speed of 5 mm/min. Then, the maximum value of tensile strength when the sealing portion was broken was measured. The measurement results are shown in Table 2 below.

FIG. 5 shows a state in which breaking strength of a sealing portion manufactured by using the pouch film stack according to the present invention is being measured.

The measurement results according to Experimental Examples 1 to 4 are shown in Table 2 below.

TABLE 2

|  | Embodiment 1 | Embodiment 2 | Comparative Example 1 | Comparative Example 2 | Comparative Example 3 |
|---|---|---|---|---|---|
| Yield strength (N/15 mm) of first sealant layer | 8.0 | 7.2 | 6.8 | 6.0 | 15.2 |
| Yield strength (N/15 mm) of second sealant layer | 14.6 | 15.0 | 15.3 | 15.0 | 25.1 |
| ΔY (%) | 82.5 | 108.3 | 125 | 150 | 65.1 |
| Difference (N/15 mm) in yield strength between first sealant layer and second sealant layer | 6.6 | 7.8 | 8.5 | 9 | 9.9 |
| Peel strength (N/15 mm) between gas barrier layer and sealant layer | 24 | 23.6 | 23 | 22 | 20 |
| Whether peeling between first sealant layer and second sealant layer occurs | X | X | O | O | O |
| Breaking strength (N/15 mm) of sealing portion @ 25° C. | 145.7 | 141.1 | 99.7 | 85.9 | 85.9 |
| Breaking strength (N/15 mm) of sealing portion @ 60° C. | 110.9 | 103.5 | 71.2 | 61.1 | 61.1 |

According to Experimental Example 1, ΔY was measured as 82.5% in Embodiment 1, as 108.3% in Embodiment 2, as 125% in Comparative Example 1, as 150% in Comparative Example 2, and as 65.1% in Comparative Example 3. That is, ΔY in each of Embodiments 1 and 2 was measured to be within the numerical range of 66% to 120%, which is the reference value of the present invention. On the other hand, ΔY in each of Comparative Examples 1 to 3 was measured to be out of the numerical range of 66% to 120%, which is the reference value of the present invention.

Meanwhile, the difference in yield strength between the first sealant layer and the second sealant layer was measured as 6.6 N/15 mm in Embodiment 1, as 7.8 N/15 mm in Embodiment 2, as 8.5 N/15 mm in Comparative Example 1, as 9.0 N/15 mm in Comparative Example 2, and as 9.9 N/15 mm in Comparative Example 3. That is, the difference in yield strength between the first sealant layer and the second sealant layer in each of Embodiments 1 and 2 was measured to be less than 8 N/15 mm, which is the reference value of the present invention. On the other hand, the difference in yield strength between the first sealant layer and the second sealant layer in each of Comparative Examples 1 to 3 was measured to be greater than 8 N/15 mm, which is the reference value of the present invention.

According to Experimental Example 2, the peel strength between the gas barrier layer and the first sealant layer was measured as 24 N/15 mm in Embodiment 1, as 23.6 N/15 mm in Embodiment 2, as 23 N/15 mm in Comparative Example 1, as 22 N/15 mm in Comparative Example 2, and as 20 N/15 mm in Comparative Example 3. Therefore, the pouch-type battery case manufactured by thermally sealing the pouch film stack in each of Embodiments 1 and 2 may have more excellent seal strength than the pouch-type battery case manufactured by thermally sealing the pouch film stack in each of Comparative Examples 1 to 3.

According to Experimental Example 3, peeling between the first sealant layer and the second sealant layer was not observed in the pouch film stack manufactured in each of Embodiments 1 and 2. On the other hand, peeling between the first sealant layer and the second sealant layer was observed in the pouch film stack manufactured in each of Comparative Examples 1 to 3. Therefore, the pouch-type battery case manufactured by thermally sealing the pouch film stack in each of Embodiments 1 and 2 may have more excellent seal strength than the pouch-type battery case manufactured by thermally sealing the pouch film stack in each of Comparative Examples 1 to 3.

According to Experimental Example 4, breaking strength of the sealing portion manufactured by using the pouch film stack in each of Embodiments 1 and 2 was measured to be remarkably higher at both 25° C. and 60° C. than breaking strength of the sealing portion manufactured by using the pouch film stack in each of Comparative Examples 1 to 3. Therefore, the pouch-type battery case manufactured by thermally sealing the pouch film stack in each of Embodiments 1 and 2 may have more excellent seal strength than the pouch-type battery case manufactured by thermally sealing the pouch film stack in each of Comparative Examples 1 to 3.

The invention claimed is:

1. A pouch film stack, comprising:
a base layer,
a gas barrier layer,
and a sealant layer, wherein the gas barrier layer is stacked on the base layer, and the sealant layer is stacked on the gas barrier layer;
wherein the sealant layer includes:
a first sealant layer including acid modified polypropylene (PPa) located adjacent to the gas barrier layer; and
a second sealant layer including cast polypropylene (CPP) stacked on the first sealant layer,
wherein the yield strength of the first sealant layer is less than the yield strength of the second sealant layer, and wherein a percentage difference in yield strength between the first and second sealant layers ($\Delta Y$) is 66% to 120%, according to the following equation:

$$\Delta Y = \left\{ \left( \frac{\text{Yield strength of second sealant layer} - \text{Yield strength of first sealant layer}}{\text{Yield strength of first sealant layer}} \right) \right\} \times 100.$$

2. The pouch film stack of claim 1, wherein a difference between the yield strength of the first sealant layer and the yield strength of the second sealant layer is less than or equal to 8 N/15 mm.

3. The pouch film stack of claim 1, wherein the yield strength of the first sealant layer is in a range from 7 N/15 mm to 15 N/15 mm.

4. The pouch film stack of claim 1, wherein the yield strength of the second sealant layer is in a range from 10 N/15 mm to 30 N/15 mm.

5. The pouch film stack of claim 1, wherein a thickness ratio between the first sealant layer and the second sealant layer is in a range from 1:0.3 to 1:3.

6. The pouch film stack of claim 1, wherein a thickness of the first sealant layer is in a range from 10 μm to 60 μm.

7. The pouch film stack of claim 1, wherein a thickness of the second sealant layer is in a range from 20 μm to 70 μm.

8. The pouch film stack of claim 1, wherein the first sealant layer and the second sealant layer comprise polypropylene.

9. The pouch film stack of claim 1, wherein the gas barrier layer comprises aluminum.

10. The pouch film stack of claim 1, wherein peel strength between the gas barrier layer and the first sealant layer is greater than 23 N/15 mm.

11. The pouch film stack of claim 1, wherein an additive is added to at least one of the first sealant layer and the second sealant layer.

12. The pouch film stack of claim 11, wherein the additive comprises at least one of carbon fiber, glass fiber and aramid fiber.

13. A pouch-type battery case comprising two of the pouch film stacks of claim 1 stacked such that a sealing portion is defined by the second sealant layers of each of the pouch film stacks sealed together,
wherein a breaking strength of the sealing portion measured at 25° C. is greater than or equal to 100 N/15 mm.

14. The pouch-type battery case of claim 13, wherein the sealing portion is formed by sealing the second sealant layers of each of the pouch film stacks together for 2 seconds under a condition of 180° C. and 0.4 Mpa.

15. A pouch-type battery case comprising two of the pouch film stacks of claim 1 stacked such that a sealing portion is defined by the second sealant layers of each of the pouch film stacks sealed together,
wherein a breaking strength of the sealing portion measured at 60° C. is greater than or equal to 80 N/15 mm.

16. The pouch-type battery case of claim 15, wherein the sealing portion is formed by sealing the second sealant layers of each of the pouch film stacks together for 2 seconds under a condition of 180° C. and 0.4 Mpa.

17. A secondary battery comprising:
a pouch-type battery case including at least one of the pouch film stack of claim 1; and
an electrode assembly accommodated inside the pouch-type battery case.

* * * * *